United States Patent [19]

Beers

[11] 4,257,932
[45] Mar. 24, 1981

[54] CURABLE COMPOSITIONS AND PROCESS
[75] Inventor: Melvin D. Beers, Schenectady, N.Y.
[73] Assignee: General Electric Company, Waterford, N.Y.
[21] Appl. No.: 70,435
[22] Filed: Aug. 28, 1979

Related U.S. Application Data

[63] Continuation-in-part of Ser. No. 919,544, Jun. 27, 1978, abandoned.

[51] Int. Cl.$^3$ .............................................. C08L 91/00
[52] U.S. Cl. .................... 260/18 S; 260/37 SB; 260/45.75 P; 428/447; 428/450; 525/477; 528/18; 528/33; 528/34; 528/901; 156/329
[58] Field of Search ............... 428/447, 450; 156/329; 528/33, 18, 34, 901; 260/18 S, 37 SB, 45.75 P; 525/477

[56] References Cited

U.S. PATENT DOCUMENTS

| | | | |
|---|---|---|---|
| 2,938,009 | 5/1960 | Lucas | 260/37 |
| 3,004,859 | 10/1961 | Lichtenwalner | 106/308 |
| 3,035,016 | 5/1962 | Bruner | 260/46.5 |
| 3,065,194 | 11/1962 | Nitzsche et al. | 260/37 |
| 3,122,522 | 2/1964 | Brown et al. | 260/46.5 |
| 3,133,891 | 5/1964 | Ceyzeriat | 260/18 |
| 3,161,614 | 12/1964 | Brown et al. | 260/46.5 |
| 3,170,894 | 2/1965 | Brown et al. | 260/46.5 |
| 3,175,993 | 3/1965 | Weyenberg | 260/46.5 |
| 3,294,739 | 12/1966 | Weyenberg | 260/46.5 |
| 3,334,067 | 8/1967 | Weyenberg | 260/46.5 |
| 3,382,205 | 5/1968 | Beers | 260/37 |
| 3,383,355 | 5/1968 | Cooper | 260/46.5 |
| 3,499,859 | 3/1970 | Matherly | 260/37 |
| 3,517,001 | 6/1970 | Berger | 260/248 |
| 3,542,901 | 11/1970 | Cooper et al. | 260/825 |
| 3,635,743 | 1/1972 | Smith | 260/46.5 |
| 3,689,454 | 9/1972 | Smith | 260/46.5 |
| 3,708,467 | 1/1973 | Smith, Jr. | 260/18 S |
| 3,719,635 | 3/1973 | Clark et al. | 260/46.5 |
| 3,779,986 | 12/1973 | Smith et al. | 260/46.5 |

*Primary Examiner*—Melvyn I. Marquis
*Attorney, Agent, or Firm*—Morgan, Finnegan, Pine, Foley & Lee

[57] ABSTRACT

Self-bonding one-package room temperature vulcanizing silicone compositions, curable in the presence of moisture to rubbery materials, comprise
(a) a silanol chain-stopped polydiorganopolysiloxane;
(b) a fluid polysiloxane having a high degree of tri- and/or tetrafunctionality;
(c) a silica filler;
(d) a cross-linking silane evolving relatively low volatility carboxylic acid fragments on hydrolysis; and
(e) a highly reactive tin-containing silanol condensation catalyst.

Such compositions can be applied to a variety of difficulty bondable substrates. They are especially useful when subjected to hot oil environments, as in automobile engines. High temperature performance is markedly improved with the addition of an iron oxide thermal stabilizer. Gasketed constructions and methods for forming them are also disclosed.

40 Claims, No Drawings
}

CURABLE COMPOSITIONS AND PROCESS

CROSS-REFERENCE TO RELATED APPLICATION

This application is a continuation-in-part of copending application Ser. No. 919,544, filed June 27, 1978, and now abandoned.

This invention relates to curable silicone rubber compositions. More particularly, it relates to self-bonding, one-package room temperature vulcanizing (RTV) compositions of a diorganosiloxane polymer, a highly functional polysiloxane, a filler, a cross-linking agent and a cross-linking catalyst. Thermal stabilizers can also be included.

BACKGROUND OF THE INVENTION

Nitzsche and Wick, U.S. Pat. No. 3,065,194 disclose a family of silicone rubber compositions comprising an essentially anhydrous mixture of (1) a linear organosiloxane polymer having hydroxyl terminal groups, (2) a polyfunctional organosilicone cross-linking agent, and (3) a metal salt, chelate, organometallic compound, acid or base, which serves as a cross-linking catalyst. Such compositions vulcanize or cure to rubbery solids when exposed to moisture and this makes them uniquely useful, in that they can be maintained over a long period of time in a single container, e.g., sealed in caulking tubes, ready for use, but then the user can apply the material and bring it into contact with water or water vapor to cure it. Such compositions are useful in sealants, electrical insulation, coatings, dental cement, caulking compounds, expansion joints, gaskets, shock absorbers, adhesives, and in many other forms.

Additional background teachings relating to one-package room temperature vulcanizing silicone compositions are to be found in Bruner, U.S. Pat. No. 3,035,016 and in Ceyzeriat, U.S. Pat. No. 3,133,891, who deal with one-package, moisture curable compositions comprising the reaction products of acyloxy-substituted silanes and hydroxylated siloxanes, the compositions curing with the liberation of acid fragments and the curing being promoted with various agents, such as organic derivatives of tin. Also of interest is Brown et al, U.S. Pat. No. 3,161,614, who show a pre-reacted silanol end-stopped diorganopolysiloxane and cross-linker, in combination with a cross-linking catalyst; Cooper, U.S. Pat. No. 3,383,355, who deals with the preparation of an alkoxy-terminated linear siloxane polymer using a neutral, finely divided solid catalyst, e.g., fuller's earth; Matherly, U.S. Pat. No. 3,499,859, who uses a hydrocarbonoxy end-blocked diorganopolysiloxane and a metal-containing curing catalyst along with boron nitride; and Cooper et al, U.S. Pat. No. 3,542,901, who use a mixture of a linear siloxane having di- or tri-functional end-blocking units with a linear siloxane having chemically nonfunctional inert and end-blocking units on one end and di- or tri-functional end-blocking units on the other, and include a catalyst and a cross-linker. Additionally, of interest are Brown et al, U.S. Pat. No. 3,122,522, who combine organopolysiloxane intermediates containing condensable "cellosolvoxyl" groups with a catalyst; Brown et al, U.S. Pat. No. 3,170,894, who combine organopolysiloxane intermediates containing condensable polyhydrocarbonoxy type radicals with a catalyst; and Weyenberg, U.S. Pat. No. 3,175,993, who combines organopolysiloxane intermediates end-blocked with alkoxylated silcarbane groups with a catalyst. Smith and Hamilton, U.S. Pat. Nos. 3,689,454 and 3,779,986, Weyenberg, U.S. Pat. Nos. 3,294,739 and 3,334,067, and Clark et al, U.S. Pat. No. 3,719,635 also disclose one-package compositions.

Applicant's U.S. Pat. No. 3,382,205 is also of interest because it discloses one package systems, which are moisture curable and which further contain mono-, di- and trialkylpolysiloxanes, the latter fluids functioning as adhesion promoters and processing aids.

All of the foregoing patents are fully incorporated herein by reference.

A special family of compositions is known to provide sealants with fairly high temperature resistance, but these are of limited utility as gasketing materials in the automotive industry in those instances where odor and corrosion can cause problems. By way of illustration, a composition comprising a silanol-terminated polydimethylsiloxane, methyltriacetoxysilane fumed silica filler and dibutyltindilaurate, is presently used in most applications but is not entirely satisfactory in some areas because it eliminates acetic acid upon curing. This cure by-product is responsible for the objectionable odor and corrosion referred to above. The presently used compositions also tend to have a relatively high degree of adhesion at low temperatures so that, for example, if a new automobile engine has to be disassembled before being put in place and operated, it is difficult to repair without damaging such things as oil pans and valve covers.

It has now been found possible to provide a low-odor, non-corrosive fast curing one-component RTV composition which exhibits, after curing by moisture, excellent oil resistance and, especially with a thermal stabilizer, high temperature resistance properties. The composition also has a low degree of adhesion at room temperature, but this improves at high temperature, thereby accomplishing a good seal, e.g., when an automobile engine is started with gasketing producing from the instant composition. They are useful in a variety of conventional applications, and particularly as gasket layers between metal surfaced parts.

DESCRIPTION OF THE INVENTION

According to the invention, there are provided fluid compositions stable under substantially anhydrous conditions and curable in the presence of moisture to a self-bonding thermally stable elastic solids resistant to hot hydrocarbon oils, said compositions comprising:

(a) 100 parts by weight of a silanol chain-stopped polydiorganosiloxane of the formula:

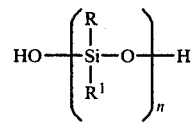

wherein R and $R^1$ are each, independently, organic radicals of up to 8 carbon atoms selected from hydrocarbyl, halohydrocarbyl and cyano lower alkyl and n is an average number of from about 10 to 15,000;

(b) from 2 to 20 parts by weight of a fluid polysiloxane containing a high degree of trifunctionality, tetrafunctionality or a mixture of tri- and tetrafunctionality and comprising (i) from 25 to 60 mole percent of monoalkylsiloxy units, siloxy units or a mixture of such units;

(ii) from 1 to 6 mole percent of trialkylsiloxy units; and (iii) from 34 to 74 mole percent of dialkylsiloxy units, said polysiloxane containing from about 0.1 to about 2% by weight of silicon-bonded hydroxyl groups;

(c) from 10 to 100 parts by weight of a finely divided silica filler;

(d) from 3 to 10 parts by weight of a cross-linking silane of the formula:

$$R_m^2 \, Si \, (OR^3)_{4-m}$$

wherein $R^2$ has the values defined from R and $R^1$ hereinabove, $R^3$ is an organic radical of 6 to 30 carbon atoms selected from hydrocarboyl and halohydrocarboyl and m has a value of 0 or 1; and (e) from 0.01 to 10 parts by weight of a highly reactive curing catalyst comprising an organic tin salt of an organic acid or a tin salt of an organic acid, said organic acid containing from 2 to 12, typically 2 to 6, carbon atoms.

According to a preferred aspect of the invention, the composition will also include from 1 to 10 parts by weight of (f) a finely divided iron oxide thermal stabilizer. These embodiments are especially useful at operating temperatures of 140° C. and above.

According to another preferred aspect of this invention, there is provided a method of preparing a rubbery material which comprises preparing a composition as above defined under substantially anhydrous conditions and thereafter exposing the composition to moisture until it cures to a rubbery material. According to other aspects of the invention there are provided articles of manufacture comprising a plurality of metal surfaced pieces, each piece having at least a part of a surface portion in close proximity to another and a gasket layer therebetween, said gasket a composition as above defined; as well as a method for producing such gasketed articles of manufacture. In preferred embodiments of this aspect, the compositions will also include an iron oxide thermal stabilizer.

The room temperature vulcanizing (RTV) compositions of the present invention are prepared by simply admixing one or more of the silanol chain-stopped polyorganosiloxanes of the above formula, the highly trifunctional fluid, the iron oxide, the silica filler, the cross-linking silane compound and the silanol reactive tin salt. The base compound (excluding cross-linker, adhesion promoter, if present, and catalyst) are ordinarily compounded at elevated temperature to remove moisture and facilitate the wetting in of the filler. Since the silanes tend to hydrolyze upon contact with moisture, care should be exercised to exclude moisture during the addition of the silane to the silanol chain-stopped polydiorganopolysiloxane. Likewise, care should be taken that the mixture of the silane, the silanol reactive tin salt catalyst, the silanol chain-stopped polydiorganosiloxane and the highly trifunctional siloxane fluid is maintained under substantially anhydrous conditions if it is desired to store the admixture for an extended period to time prior to conversion of the composition to the cured, solid, elastic silicone rubber state. On the other hand, if it is desired to permit the mixture to cure immediately, then no special precautions are necessary and the components can be mixed and placed in the form or shape in which it is desired for the composition to be cured.

So long as the specified ratios of ingredients are employed, a wide choice of components is available from which to prepare the compositions of this invention. These are described in many places, such as U.S. Pat. Nos. 3,779,986; 3,065,194; 2,294,739; 3,334,067; 3,382,205 and 3,708,467, the disclosures of which are incorporated herein by reference.

With respect to the silanol chain-stopped polyorganosiloxane component (a), these can be selected from those represented by the formula:

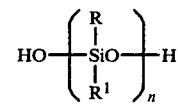

wherein R and $R^1$ are each organic radicals of up to 20, and preferably, up to 8 carbon atoms selected from hydrocarbyl, halohydrocarbyl and cyano lower alkyl, and n is a number that varies generally from about 10 to 15,000, preferably, from 100 to about 3,000, and, more preferably, from 300 to 1,500.

The silanol chain-stopped polydiorganosiloxanes are well known in the art and include compositions containing different R and $R^1$ groups. For example, the R groups can be methyl, while the $R^1$ groups can be phenyl and/or beta-cyanoethyl. Furthermore, within the scope of the definition of polydiorganosiloxanes useful in this invention are copolymers of various types of diorganosiloxane units, such as silanol chain-stopped copolymers of dimethylsiloxane units, diphenylsiloxane units and methylphenylsiloxane units or, for example, copolymers of dimethylsiloxane units, methylphenylsiloxane units and methylvinylsiloxane units. Preferably, at least 50% of the R and $R^1$ groups of the silanol chain-stopped polydiorganosiloxanes are alkyl, e.g., methyl groups.

In the above formula, R and $R^1$ can be, for example, any groups illustrated in the foregoing patents.

The silanol chain-stopped polydiorganosiloxanes employed in the practice of the present invention may vary from low viscosity thin fluids to viscous gums, depending upon the value of n and the nature of the particular organic groups represented by R and $R^1$.

The viscosity of component (a) can vary broadly, e.g., in the range of 30 to 10,000,000 cps. at 25° C. Preferably, it will be in the range of 1,000 to 200,000 cps, and most preferably, from about 2,000 to 30,000 cps. at 25° C.

The highly trifunctional polysiloxane component (b) can be made by means known to those skilled in this art. For example, a mixture of (i) monoalkyl trichlorosilane; (ii) dialkyldichlorosilane and (iii) alkyltrichlorosilane, silicone tetrachloride or a mixture thereof, at the appropriate mole ratio can be run into toluene and water to co-hydrolyze them. Then the mixture can be heated, e.g., at about 60° C. for a time, e.g., 3 hours sufficient to insure completion of the reaction. The oil phase is separated and neutralized, e.g., by washing with an aqueous solution of sodium carbonate or bicarbonate. After filtration to remove insolubles and devolatilization, e.g., by heating at about 140° C. under a vacuum, e.g., about 2 mm, of mercury, the component (b) remains as the residue. Preferred for economy's sake is to keep the silicon-bonded hydroxyl content to less than 0.6% by weight to minimize the viscosity of the final composition and to keep the cross-linker level to a minimum. This is done by heating the product at 110° C. in the presence of approximately one pecent of sodium carbonate. The water from the silanol condensation can conveniently be removed by azeotropic distillation, e.g., with toluene. After removal of the toluene by distillation the product is filtered before use. Beers, U.S. Pat. No. 3,382,205, is incorporated for its illustrative teachings. Component (b) will generally comprise from 2 to 20 parts by weight per 100 parts of component (a) and preferably from about 5 to 15 parts per 100 parts by weight of the composition.

Preferably, component (b) will have a viscosity in the range of 50 to 300 cps. at 25° C. Preferably, also, in component (b) at least 50 percent of the alkyl substituents are methyl and the fluid comprises from 0.2 to 0.6 percent by weight of silanol. Especially preferably, the monoalkylsiloxy units, siloxy units or mixed such units comprise about 35 to 45 mole percent, the trialkylsiloxy units comprise from 3 to 5 mole percent, the dialkylsiloxy units comprise from 45 to 67 mole percent, and the silanol content is about 0.2 to 0.5 percent by weight.

The silica component (c) is known in this art as a filler for silicone compositions. It is finely divided in form and preferably is of the type known as fumed silica. Preferably, it should have a surface area of about 200 sq. meters/gram. A preferred form will be an organosilicone—or silazane—treated silica such as described in Lucas, U.S. Pat. No. 2,938,009; Lichtenwalner, U.S. Pat. No. 3,004,859; and Smith, U.S. Pat. No. 3,635,743; incorporated herein by reference. The silica filler (c) is generally employed in amounts of from 10 to 100, preferably from 15 to about 40 parts by weight per 100 parts by weight of component (a), and preferably from 20 to 30 parts by weight per 100 parts by weight of the composition.

The silane cross-linking agent (d) of the formula:

$$R_m^2 Si(OR^3)_{4-m}$$

is one which has values for $R^2$ which are, independently, the same as those defined for R and $R^1$ above. $R^3$ should contain between 6 and 30 carbon atoms to preclude formation of odorous, corrosive by-products during the curing reaction.

Illustrative of such silanes useful in the RTV compositions of this invention are the following:

CH₃Si(OCO(CH₂)₄CH₃)₃

Si(OCO(CH₂)₄CH₃)₄

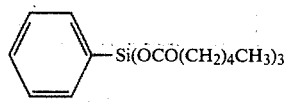

CH₃(CH₂)₆CH₂Si(OCO(CH₂)₄CH₃)₃

CF₃(CH₂)₃Si(OCO(CH₂)₄CH₃)₃

NCCH₂CH₂Si(OCO(CH₂)₄CH₃)₃

CH₃Si(OCOCH(C₂H₅)(CH₂)₃CH₃)₃

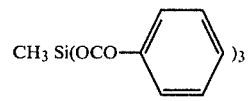

The silanes are well known in the art and can be made by techniques disclosed, for example, in Beers, U.S. Pat. No. 3,382,205.

Preferably in cross-linking agent (d), m has a value of 1 and the preferred silanes are methyl tris-(2-ethylhexanoxy)silane and methyl tris(benzoxy) silane. The silane is generally used in amounts of from 3 to 10 parts by weight, based on 100 parts by weight of component (a) and preferably from 5 to 7 parts by weight, same basis.

With respect to silanol reactive tin catalyst component (e), in general either an organic tin salt of an organic acid or a tin salt of an organic acid can be used, although the former is preferred. An organic acid carbon content of between 2 and 12 provides the best combination of cure rate and ultimate properties. The organic element of the organo tin salt can be one or two alkyl radicals, e.g., of from 1 or 2 to 6 carbon atoms, e.g., dimethyl, monobutyl or dibutyl and the organic acid radical can have from 2 to 6 or even 12 carbon atoms. Reactivity is enhanced with higher acid radicals if the shortest alkyl radicals are present. Examples are tin hexanoate, dibutyltin hexanoate, dibutyltin diacetate, dibutyltin adipate, dibutyltin dipropionate, dibutyltin dibutyrate, monobutyltin triacetate, dimethyltin bis-neodecanoate and the like. These are either commercially available or can be made by those skilled in this art. Preferred are dibutyltin diacetate and dimethyltin bis-neodecanoate.

The catalyst is generally present in amounts between 0.01 and 10.0 parts by weight per 100 parts by weight of component (a), and preferably between 0.02 and 5.0 parts by weight. Especially preferably, from about 0.05 to about 0.15 parts by weight of catalyst will be used for each 100 parts by weight of total composition.

The optional iron oxide thermal stabilizer component (f) is an item of commerce, conventionally used and widely available in finely divided form for use as a filler in plastic compositions. Preferably, the iron oxide has a pH in the range of 6.0 to 7.5, to achieve maximum thermal and shelf-aging stability. The amount used will be in the range of 1 to 10 parts by weight, based on 100 parts by weight of component (a) and, preferably, from 3 to 6 parts by weight based on 100 parts by weight of the total composition.

In preferred embodiments, the present compositions can also optionally include an adhesion promoter, e.g., from 0.2 to 2 parts of such promoter per 100 parts of component (a). These will generally be nitrogen-containing compounds, e.g., a class of promoters of the formula:

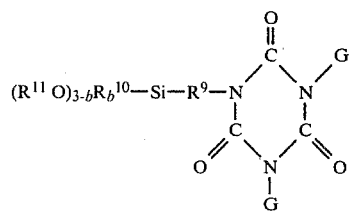

wherein G is a $(R^{11}O)_{3-b}-R_b^{10}-Si-R^9$ radical, styryl, vinyl, allyl, chloroallyl or cyclohexenyl radical or a $R^{10}$ radical, as hereinafter defined; $R^9$ is a divalent radical selected from alkylenearylene, alkylene, cycloxyene and halosubstituted such divalent radicals; $R^{10}$ is a radical of up to 8 carbon atoms selected from hydrocarbyl or halohydrocarbyl and $R^{11}$ is a radical of the type defined for $R^{10}$ and also cyano lower alkyl; and b is 0 to 3.

Such adhesion promoters are disclosed in Berger, U.S. Pat. No. 3,517,001, which is incorporated herein by reference. The preferred such promoters are 1,3,5-tris-trimethoxysilylpropylisocyanate and bis-1,3-trimethoxysilypropylisocyanurate, the former being most preferred.

Although any conventional adhesion promotion can be used, special mention is also made of an adhesion promoter known as glycidoxypropyltrimethoxysilane.

Additional conventional ingredients can also be included, such as flame retardants, stabilizing agents, pigments, and the like.

The compositions of this invention are stable in the absence of moisture. Consequently, they can be stored for prolonged periods of time without deleterious effect. During this period of storage, no significant change occurs in the physical properties of the room temperature vulcanizing compositions. This is especially advantageous commercially because it insures that once the composition is prepared with a given consistency and cure time, neither change significantly on storage. Storage stability is one of the characteristics which makes the present compositions valuable in one-package systems.

The compositions prepared by mixing the catalyst and the silane with the silanol chian-stopped polydiorganosiloxane and other ingredients under anhydrous conditions can be used without further modification in many sealing, caulking and coating applications merely by placing the compositions in the desired location and permitting them to cure upon exposure to the moisture present in the atmosphere. Upon such exposure, even after previous storage for many months, a "skin" will form on the present compositions within a relatively short time, e.g., from 10 minutes to about 8 hours, and they will cure to a rubbery state within from a few hours to several days, at room temperature, e.g., from 18° to 25° C.

Where the compositions of the present invention contain ingredients other than the silanol-terminated polydiorganosiloxane, the tri- and/or tetrafunctional siloxane fluid, the silane cross-linker and the tin catalyst, these additional ingredients can be added in any desired manner. However, for ease in manufacturing, it is often most convenient to form a "base" blend of all of the components except the silane, the tin catalyst nd, if present, the adhesion promoter, then to remove moisture from the base blend, e.g., by maintaining it under vacuum at elevated temperature, e.g., 50°–100° C., and thereafter to add the silane, the tin catalyst and, optionally, the adhesion promoter, just prior to packaging in containers protected from moisture.

The compositions of this invention are particularly suitable for caulking and sealing applications where excellent adhesion to a variety of substrates is important. For example, the compositions are useful in household and industrial caulking and sealing in buildings, factories, automobiles, and the like, and with substrates such as masonry, glass, plastic, metal, wood, and the like. There is little or no tendency for the present compositions to corrode sensitive substrates, e.g., metals, such as copper and brass. They are also advantageous in having excellent rates of application, making them readily suitable for application from conventional caulkers under standard conditions.

DESCRIPTION OF THE PREFERRED EMBODIMENTS

The following examples are illustrative only and should not be construed as limiting the invention. The terms M, D, T and Q are art-recognized designations for, respectively, M = monofunctional organosiloxane unit, $R_3SiO_{\frac{1}{2}}$;

D = difunctional organosiloxane unit, $R_2SiO_{2/2}$;

T = trifunctional organosiloxane unit, $RSiO_{3/2}$; and

Q = tetrafunctional organosiloxane unit, $SiO_{4/2}$

EXAMPLE 1

| A base compound is prepared comprising the following (by weight): | |
|---|---|
| 6000 cps. viscosity (25° C.) silanol-terminated polydimethylsiloxane | 100 parts |
| a M, D, T, OH silicone oil containing approximately 4 mole % trimethylsiloxy, 56 mole % dimethylsiloxy; 40 mole % methylsiloxy groups and 0.5 weight % OH | 10 parts |
| Iron oxide, pH 6.0–7.5 | 6 parts |
| Dimethylsiloxane-treated fumed silica having a surface area of approximately 200 sq. meters/g. | 25 parts |
| A catalyst mixture is prepared comprising the following (by weight): | |
| Methyl tris-2-ethylhexanoxy silane (cross-linker) | 6 parts |
| Glycidoxypropyltrimethoxysilane (adhesion promoter) | 0.25 parts |
| Dibutyltindiacetate | 0.06 parts |

One hundred parts of the base compound is mixed together with the catalyst mixture in the absence of air and atmospheric moisture and packaged in 3 oz. metal containers. Test sheets are then prepared and allowed to cure at 77°±2° F. and 50±5% relative humidity for 3 days. The following test results are obtained:

| Shore A hardness | 42 |
|---|---|
| Tensile strength, psi | 500 |
| Elongation, % | 380 |

COMPARATIVE EXAMPLE A

A base compound is prepared comprising the following (by weight):

| 6,000 cps. viscosity, silanol terminated polydimethylsiloxane | 100 parts |
|---|---|
| Octamethyltetrasiloxane-treated fumed silica having a surface area of approximately 200m²/gm. | |

| (filler) | 25 parts |
|---|---|
| Iron oxide | 6 parts |

A catalyst mixture is prepared comprising the following (by weight):

| Methyltris-(2-ethylhexoxy) silane | 6 parts |
|---|---|
| Dibutyltin diacetate (catalyst) | 0.06 parts |
| Glycidoxypropyltrimethoxysilane (adhesion promoter) | 0.25 parts |

One hundred parts of the base compound is mixed together with the catalyst mixture in the absence of air and atmospheric moisture. The anhydrous material is cured and tested as described in Example 1. The following test results are obtained:

| Shore A hardness | 43 |
|---|---|
| Tensile strength, psi | 630 |
| Elongation, % | 370 |

To determine the relative resistances to hot hydrocarbon oil, cured specimens of Example 1 and Comparative Example A were suspended in 5W-30 motor oil at 300° F. for various periods of time, and the hardness tensile strength, elongation and volume swells were measured. The results are set forth in the following Table:

TABLE

Oil Immersion Resistance Properties
Properties (after immersion)
5W-30 Oil at 300° F.

| 72 hours | | |
|---|---|---|
| | Example 1 | Comparison Example A |
| Shore A, hardness | 16 | 18 |
| Tensile, psi | 100 | 140 |
| Elongation, % | 300 | 320 |
| Volume swell, % | 37 | 42 |

| 168 hours | | |
|---|---|---|
| | Example 1 | Comparison Example A |
| Shore A, hardness | 19 | 18 |
| Tensile, psi | 190 | 190 |
| Elongation, % | 320 | 320 |
| Volume swell, % | 37 | 43 |

| 336 hours | | |
|---|---|---|
| | Example 1 | Comparison Example A |
| Shore A, hardness | 17 | 12 |
| Tensile, psi | 200 | 70 |
| Elongation, % | 330 | 240 |
| Volume swell, % | 36 | 40 |

| 504 hours | | |
|---|---|---|
| | Example 1 | Comparison Example A |
| Shore A, hardness | 17 | 9 |
| Tensile, psi | 175 | 40 |
| Elongation, % | 300 | 250 |
| Volume swell, % | 36 | 40 |

It can be seen that the composition of Example 1 is more resistant to reversion than the composition of the comparative example. This illustrates the superiority of the highly trifunctional (T-containing) component of the compositions of this invention.

EXAMPLE 2

The procedure of Example 1 is repeated, substituting 1.5 parts by weight of 1,3,5-tris-trimethoxysilylpropylisocyanurate as the adhesion promoter. The cured product had the following properties:

| Shore A hardness | 46 |
|---|---|
| Tensile strength, psi | 620 |
| Elongation, % | 400 |

Other modifications can be made. For example, the iron oxide thermal stabilizer can be omitted. Instead of methyl tris-(2-ethylhexoxy)silane, methyl tris (benzoxy)silane can be used as a cross-linker. However, if instead of the M,D,T fluid employed in Example 1, there is used a M,D,T fluid containing a substantially lower T level, the oil resistance deteriorates:

COMPARATIVE EXAMPLE B

A base compound is prepared comprising the following composition:

| 6,000 cps. viscosity (25° C.) silanol terminated polydimethyl siloxane | 100 parts |
|---|---|
| A M, D, T, OH silicone oil containing approximately 5 mole % trimethylsiloxy, 20 mole % monomethylsiloxy, 75 mole % dimethylsiloxy and approximately 0.5 weight % OH | 10 parts |
| Iron oxide, pH 6.0-7.5 | 6 parts |
| Dimethylsiloxane-treated fumed silica having a surface area of ~200 m²/g | 25 parts |

The same catalyst mixture as that utilized in Example 1 was incorporated in the above base compound in the absence of moisture at the exact same percentage composition.

The following room temperature test results were obtained:

| Shore hardness | 35 |
|---|---|
| Tensile, psi | 600 |
| Elongation, % | 420 |

To determine its relative resistance to hot hydrocarbon oil cured specimens were suspended in 5W-30 oil at 300° F. After 72 hours under these environmental conditions the hardness, tensile strength, elongation and volume swell were measured. The tensile strength was so low that the test was discontinued. The data shown below obviously illustrate the advantages of the high T containing oil used in Example 1. The results are set forth below:

| | 72 hrs./300° F. in 5W-30 |
|---|---|
| Shore A, hardness | 9 |
| Tensile, psi | 40 |
| Elongation, % | 240 |
| Swell, % | 36 |

EXAMPLE 3

The procedure of Example 1 is repeated, substituting for the dibutyltin diacetate catalyst, 0.1 parts of dimethyltin bis-neodecanoate (Witco UL-28). A composition according to this invention is obtained.

EXAMPLE 4

A gasket is formed between two corrosion-susceptible metal workpieces by spreading a coating of the composition of Example 1 on a surface of the first piece and bringing the surface of the second piece into close proximity thereto, thereby forming a sandwich with the composition therebetween. The composition is cured to a rubbery state without releasing any substantial amount of corrosive materials and odorous materials by exposing the structure to a moist atmosphere at about 75° F. until a strong bond is formed.

Obviously, other modifications and variations of the present invention are possible in the light of the above teachings. It is, therefore, to be understood that changes may be made in the particular embodiments of this invention which are within the full intended scope of the invention as defined by the appended claims.

I claim:

1. A fluid composition stable under substantially anhydrous conditions and curable in the presence of moisture to a self-bonding highly thermally stable elastic solid resistant to hot hydrocarbon oils, said composition comprising:
   (a) 100 parts by weight of a silanol chain-stopped polydiorganosiloxane of the formula:

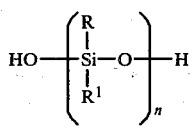

wherein R and $R^1$ are each, independently, organic radicals of up to 8 carbon atoms selected from hydrocarbyl, halohydrocarbyl and cyano lower alkyl and n is an average number of from about 10 to 15,000;
   (b) from 2 to 20 parts by weight of a fluid polysiloxane containing a high degree of trifunctionality, tetrafunctionality or a mixture of tri- and tetrafunctionality and comprising
      (i) from 25 to 60 mole percent of monoalkylsiloxy units, siloxy units or a mixture of such units;
      (ii) from 1 to 6 mole percent of trialkylsiloxy units; and
      (iii) from 34 to 74 mole percent of dialkylsiloxy units,
said polysiloxane containing from about 0.1 to about 2% by weight of silicon-bonded hydroxyl groups;
   (c) from 10 to 100 parts by weight of a finely divided silica filler;
   (d) from 3 to 10 parts by weight of a cross-linking silane of the formula:

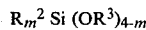

$$R_m^2 Si(OR^3)_{4-m}$$

wherein $R^2$ has the values defined from R and $R^1$ hereinabove, $R^3$ is an organic radical of 6 to 30 carbon atoms selected from hydrocarboyl and halohydrocarboyl and m has a value of 0 or 1; and
   (e) from 0.01 to 10 parts by weight of a curing catalyst of the group consisting of an organic tin salt of an organic acid and a tin salt of an organic acid, said organic acid containing from 2 to 6 carbon atoms.

2. A composition as defined in claim 1 which also includes from 1 to 10 parts by weight of (f) a finely divided iron oxide thermal stabilizer.

3. A composition as defined in claim 1 wherein the viscosity of component (a) is within the range of 2,000 to 200,000 cps. at 25° C.

4. A composition as defined in claim 3 wherein the viscosity of component (a) is within the range of 2,000 to 30,000 cps. at 25° C.

5. A composition as defined in claim 1 wherein, in component (a), at least 50% of the total number of R and $R^1$ groups are alkyl radicals and any remaining groups are aryl radicals.

6. A composition as defined in claim 5 wherein the alkyl radicals are methyl radicals and any remaining aryl radicals are phenyl radicals.

7. A composition as defined in claim 1 wherein the viscosity of component (b) is in the range of 30 to 5,000 cps. at 25° C.

8. A composition as defined in claim 1 wherein, in component (b), at least 50 percent of the alkyl substituents are methyl radicals and the fluid comprises from 0.2 to 0.6 percent by weight of silicon-bonded hydroxyl groups.

9. A composition as defined in claim 8 wherein, in component (b), the monoalkylsiloxy units, siloxy units or mixed such units comprise about 35 to 45 mole percent, the trialkylsiloxy units comprise from 3 to 5 mole percent, the dialkylsiloxy units comprise from 45 to 67 mole percent, and the silicon-bonded hydroxyl content is about 0.2 to 0.5% by weight.

10. A composition as defined in claim 1 wherein the finely divided silica component (c) has been treated with dimethylcyclic siloxanes, has a surface area of about 200 square meters/gram and comprises about 20 to 30 parts by weight per 100 parts by weight of the total composition.

11. A composition as defined in claim 1 wherein in component (d), at least 50% of the total number of $R^2$ groups are alkyl radicals and any remaining groups are aryl radicals and m is 1.

12. A composition as defined in claim 11 wherein the alkyl radicals are methyl radicals and any remaining aryl radicals are phenyl radicals.

13. A composition as defined in claim 11 wherein the $R^3$ groups are 2-ethylhexanoxy radicals.

14. A composition as defined in claim 11 wherein the $R^3$ groups are benzoxy radicals.

15. A composition as defined in claim 1 wherein catalyst component (e), is an organic tin salt of an organic acid containing from 2 to 6 carbon atoms.

16. A composition as defined in claim 15 wherein said catalyst is dibutyltindiacetate.

17. A composition as defined in claim 2 wherein iron oxide component (f) has a pH range of 6.0 to 7.5 and comprises about 3 to 6 parts by weight per 100 parts by weight of the total composition.

18. A fluid composition highly thermally stable and stable under substantially anhydrous conditions and curable in the presence of moisture to a self-bonding elastic solid resistant to hot hydrocarbon oils, said composition comprising:
   (a) 100 parts by weight of a silanol chain-stopped polydiorgnosiloxane of the formula:

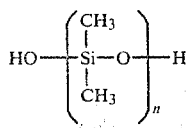

wherein n is 100 to 3,000;

(b) from 5 to 15 parts by weight of a fluid polymethylsiloxane containing a high degree of trifunctionality, and comprising:
  (i) from 35 to 45 mole percent of methylsiloxy units;
  (ii) from 3 to 5 mole percent of trimethylsiloxy units; and
  (iii) from 50 to 62 mole percent of dimethylsiloxy units, and from about 0.2 to about 0.6 percent by weight of silicon-bonded hydroxyl groups;
(c) from 20 to 30 parts by weight of a finely divided fumed silica filler having a surface area of about 200 square meters per gram;
(d) from 5 to 7 parts of a cross-linking silane of the formula

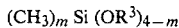

wherein $R^3$ is hydrocarboyl of from 6 to 10 carbon atoms and m is 0 or 1; and
(e) from 0.02 to 5 parts by weight of an organotin salt of an organic acid of from 2 to 6 carbon atoms.

19. A composition as defined in claim 18 which also includes (f) from 3 to 7 parts by weight of a finely divided iron oxide stabilizer having a pH in the range of 6.0 to 7.5.

20. A composition as defined in claim 2 wherein, in component (a), R and $R^1$ are each methyl; in component (d), $R^3$ is 2-ethylhexanoyl; and component (e) comprises dibutyltindiacetate.

21. A composition as defined in claim 1 wherein from 0.2 to 2 parts of an adhesion promoter per 100 parts total composition is also included.

22. A composition as defined in claim 21 wherein said adhesion promoter is glycidoxypropyltrimethoxysilane.

23. A composition as defined in claim 21 wherein said adhesion promoter is 1,3,5-tris-trimethoxysilylpropylisocyanurate.

24. A method of preparing a rubbery material which comprises preparing a composition in accordance with claim 1 under substantially anhydrous conditions and thereafter exposing the composition to moisture until it cures to a rubbery material.

25. A method of preparing a rubbery material which comprises preparing a composition in accordance with claim 2 under substantially anhydrous conditions and thereafter exposing the composition to moisture until it cures to a rubbery material.

26. An article of manufacture comprising a plurality of metal surfaced pieces, each piece having at least a part of a surface portion in close proximity to another and a gasket layer therebetween, said gasket comprising a rubbery, moisture-cured composition which is highly thermally stable comprising:
(a) 100 parts by weight of a silanol chain-stopped polydiorganosiloxane of the formula:

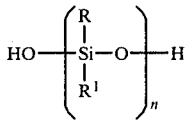

wherein R and $R^1$ are each, independently, organic radicals of up to 8 carbon atoms selected from hydrocarbyl, halohydrocarbyl and cyano lower alkyl and n is an average number of from about 10 to 15,000;
(b) from 2 to 20 parts by weight of a fluid polysiloxane containing a high degree of trifunctionality, tetrafunctionality or a mixture of tri- and tetrafunctionality and comprising
  (i) from 25 to 60 mole percent of monoalkylsiloxy units, siloxy units or a mixture of such units;
  (ii) from 1 to 6 mole percent of trialkylsiloxy units; and
  (iii) from 34 to 74 mole percent of dialkylsiloxy units,
said polysiloxane containing from about 0.1 to about 2% by weight of silicon-bonded hydroxyl groups;
(c) from 10 to 100 parts by weight of a finely divided silica filler;
(d) from 3 to 10 parts by weight of a cross-linking silane of the formula:

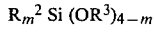

wherein $R^2$ has the values defined from R and $R^1$ hereinabove, $R^3$ is an organic radical of 6 to 30 carbon atoms selected from hydrocarboyl and halohydrocarboyl and m has a value of 0 or 1; and
(e) from 0.01 to 10 parts by weight of a curing catalyst of the group consisting of an organic tin salt of an organic acid and a tin salt of an organic acid, said organic acid containing from 2 to 6 carbon atoms.

27. An article of manufacture as defined in claim 26 wherein said composition also includes from 1 to 10 parts by weight of a finely divided iron oxide thermal stabilizer.

28. A method comprising:
(i) providing a plurality of metal surfaced pieces;
(ii) applying a layer of a moisture-curable gasket-forming composition to at least a portion of at least one of the metal surfaces;
(iii) bringing at least two metal surfaced pieces into proximity so as to complete the formation of a moisture-curable gasketing layer therebetween; and
(iv) exposing the article of step (iii) to moisture until the gasketing layer has cured to a rubbery material, said moisture-curable gasketing composition comprising:
(a) 100 parts by weight of a silanol chain-stopped polydiorganosiloxane of the formula:

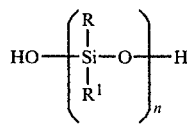

wherein R and $R^1$ are each, independently, organic radicals of up to 8 carbon atoms selected from hydrocarbyl, halohydrocarbyl and cyano lower alkyl and n is an average number of from about 10 to 15,000;
(b) from 2 to 20 parts by weight of a fluid polysiloxane containing a high degree of trifunctionality, tetrafunctionality or a mixture of tri- and tetrafunctionality and comprising
   (i) from 25 to 60 mole percent of monoalkylsiloxy, siloxy units or a mixture of such units;
   (ii) from 1 to 6 mole percent of trialkylsiloxy units; and
   (iii) from 34 to 74 mole percent of dialkylsiloxy units;
(c) from 10 to 100 parts by weight of a finely divided silica filler;
(d) from 3 to 10 parts by weight of a cross-linking silane of the formula:

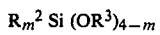

wherein $R^2$ has the values defined from R and $R^1$ hereinabove, $R^3$ is an organic radical of 6 to 30 carbon atoms selected from hydrocarboyl and halohydrocarboyl and m has a value of 0 or 1; and
(e) from 0.01 to 10 parts by weight of a curing catalyst of the group consisting of an organic tin salt of a fatty acid and a tin salt of a fatty acid, said fatty acids containing from 2 to 6 carbon atoms.

29. A method as defined in claim 28 wherein said composition also includes from 1 to 10 parts by weight of a finely divided iron oxide thermal stabilizer.

30. A fluid composition stable under substantially anhydrous conditions and curable in the presence of moisture to a self-bonding highly thermally stable elastic solid resistant to hot hydrocarbon oils, said composition comprising:
(a) 100 parts by weight of a silanol chain-stopped polydiorganosiloxane of the formula:

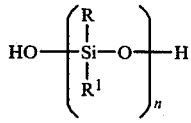

wherein R and $R^1$ are each, independently, organic radicals of up to 8 carbon atoms selected from hydrocarbyl, halohydrocarbyl and cyano lower alkyl and n is an average number of from about 10 to 15,000;
(b) from 2 to 20 parts by weight of a fluid polysiloxane containing a high degree of triflunctionality, tetrafunctionality or a mixture of tri- and tetrafunctionality and comprising
   (i) from 25 to 60 mole percent of monoalkylsiloxy units, siloxy units or a mixture of such units;
   (ii) from 1 to 6 mole percent of trialkylsiloxy units; and
   (iii) from 34 to 74 mole percent of dialkylsiloxy units,
said polysiloxane containing from about 0.1 to about 2% by weight of silicon-bonded hydroxyl groups;
(c) from 10 to 100 parts by weight of a finely divided silica filler;
(d) from 3 to 10 parts by weight of a cross-linking silane of the formula:

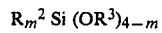

wherein $R^2$ has the values defined from R and $R^1$ hereinabove, $R^3$ is an organic radical of 6 to 30 carbon atoms selected from hydrocarboyl and halohydrocarboyl and m has a value of 0 or 1; and
(e) from 0.1 to 10 parts by weight of a highly reactive curing catalyst of the group consisting of an organic tin salt of an organic acid or a tin salt of an organic acid, said organic acid containing from 2 to 12 carbon atoms.

31. A composition as defined in claim 30 which also includes from 1 to 10 parts by weight of (f) a finely divided iron oxide thermal stabilizer.

32. A composition as defined in claim 30 wherein said catalyst is dimethyltin bis-neodecanoate.

33. A fluid composition highly thermally stable and stable under substantially anhydrous conditions and curable in the presence of moisture to a self-bonding elastic solid resistant to hot hydrocarbon oils, said composition comprising:
(a) 100 parts by weight of a silanol chain-stopped polydiorganosiloxane of the formula:

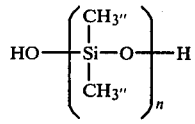

wherein n is 100 to 3,000;
(b) from 5 to 15 parts by weight of a fluid polymethylsiloxane containing a high degree of trifunctionality, and comprising:
   (i) from 35 to 45 mole percent of methylsiloxy units;
   (ii) from 3 to 5 mole percent of trimethylsiloxy units; and
   (iii) from 50 to 62 mole percent of dimethylsiloxy units, and from about 0.2 to about 0.6 percent by weight of silicon-bonded hydroxyl groups;
(c) from 20 to 30 parts by weight of a finely divided fumed silica filler having a surface area of about 200 square meters per gram;
(d) from 5 to 7 parts of a cross-linking silane of the formula

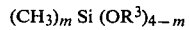

wherein $R^3$ is hydrocarboyl of from 6 to 10 carbon atoms and m is 0 or 1; and
(e) from 0.02 to 5 parts by weight of a highly reactive organotin salt of an organic acid of from 2 to 12 carbon atoms.

34. A composition as defined in claim 18 which also includes (f) from 3 to 7 parts by weight of a finely divided iron oxide stabilizer having a pH in the range of 6.0 to 7.5.

35. A method of preparing a rubbery material which comprises preparing a composition in accordance with claim 30 under substantially anhydrous conditions and thereafter exposing the composition to moisture until it cures to a rubbery material.

36. A method of preparing a rubbery material which comprises preparing a composition in accordance with claim 31 under substantially anhydrous conditions and thereafter exposing the composition to moisture until it cures to a rubbery material.

37. An article of manufacture comprising a plurality of metal surfaced pieces, each piece having at least a part of a surface portion in close proximity to another and a gasket layer therebetween, said gasket comprising a rubbery, moisture-cured composition which is highly thermally stable comprising:

(a) 100 parts by weight of a silanol chain-stopped polydiorganosiloxane of the formula:

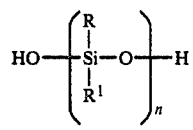

wherein R and $R^1$ are each, independently, organic radicals of up to 8 carbon atoms selected from hydrocarbyl, halohydrocarbyl and cyano lower alkyl and n is an average number of from about 10 to 15,000;

(b) from 2 to 20 parts by weight of a fluid polysiloxane containing a high degree of trifunctionality, tetrafunctionality or a mixture of tri- and tetrafunctionality and comprising (i) from 25 to 60 mole percent of monoalkylsiloxy units, siloxy units or a mixture of such units;

(ii) from 1 to 6 mole percent of trialkylsiloxy units; and (iii) from 34 to 74 mole percent of dialkylsiloxy units, said polysiloxane containing from about 0.1 to about 2% by weight of silicon-bonded hydroxyl groups;

(c) from 10 to 100 parts by weight of a finely divided silica filler;

(d) from 3 to 10 parts by weight of a cross-linking silane of the formula:

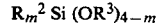

wherein $R^2$ has the values defined from R and $R^1$ hereinabove, $R^3$ is an organic radical of 6 to 30 carbon atoms selected from hydrocarboyl and halohydrocarboyl and m has a value of 0 or 1; and (e) from 0.01 to 10 parts by weight of a highly reactive curing catalyst of the group consisting of an organic tin salt of an organic acid or a tin salt of an organic acid, said organic acid containing from 2 to 12 carbon atoms.

38. An article of manufacture as defined in claim 37 wherein said composition also includes from 1 to 10 parts by weight of a finely divided iron oxide thermal stabilizer.

39. A method comprising:

(i) providing a plurality of metal surfaced pieces;

(ii) applying a layer of a moisture-curable gasket-forming composition to at least a portion of at least one of the metal surfaces;

(iii) bringing at least two metal surfaced pieces into proximity so as to complete and formation of a moisture-curable gasketing layer therebetween; and (iv) exposing the article of step (iii) to moisture until the gasketing layer has cured to a rubbery material, said moisture-curable gasketing composition comprising:

(a) 100 parts by weight of a silanol chain-stopped polydiorganosiloxane of the formula:

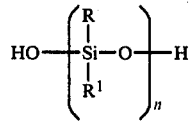

wherein R and $R^1$ are each, independently, organic radicals of up to 8 carbon atoms selected from hydrocarbyl, halohydrocarbyl and cyano lower alkyl and n is an average number of from about 10 to 15,000;

(b) from 2 to 20 parts by weight of a fluid polysiloxane containing a high degree of trifunctionality, tetrafunctionality or a mixture of tri- and tetrafunctionality and comprising (i) from 25 to 60 mole percent of monoalkylsiloxy, siloxy units or a mixture of such units;

(ii) from 1 to 6 mole percent of trialkylsiloxy units; and (iii) from 34 to 74 mole percent of dialkylsiloxy units;

(c) from 10 to 100 parts by weight of a finely divided silica filler;

(d) from 3 to 10 parts by weight of a cross-linking silane of the formula:

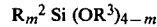

wherein $R^2$ has the values defined from R and $R^1$ hereinabove, $R^3$ is an organic radical of 6 to 30 carbon atoms selected from hydrocarboyl and halohydrocarboyl and m has a value of 0 or 1; and (e) from 0.01 to 10 parts by weight of a highly reactive curing catalyst of the group consisting of an organic tin salt of a fatty acid or a tin salt of a fatty acid, said fatty acid containing from 2 to 12 carbon atoms.

40. A method as defined in claim 39 wherein said composition also includes from 1 to 10 parts by weight of a finely divided iron oxide thermal stabilizer.

* * * * *